(12) United States Patent
Nadachi et al.

(10) Patent No.: US 11,479,038 B2
(45) Date of Patent: Oct. 25, 2022

(54) PRINTING LIQUID SUPPLY DEVICE, PRINTING LIQUID CIRCULATION DEVICE AND PRINTING MACHINE

(71) Applicant: MITSUBISHI HEAVY INDUSTRIES MACHINERY SYSTEMS, LTD., Kobe (JP)

(72) Inventors: Mitsuhiro Nadachi, Kobe (JP); Makoto Shimohatsubo, Kobe (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 16 days.

(21) Appl. No.: 16/969,317

(22) PCT Filed: Feb. 22, 2018

(86) PCT No.: PCT/JP2018/006464
§ 371 (c)(1),
(2) Date: Aug. 12, 2020

(87) PCT Pub. No.: WO2019/163053
PCT Pub. Date: Aug. 29, 2019

(65) Prior Publication Data
US 2021/0046753 A1 Feb. 18, 2021

(51) Int. Cl.
*B41J 2/045* (2006.01)
*B41F 31/00* (2006.01)
*G01N 11/12* (2006.01)

(52) U.S. Cl.
CPC ......... *B41J 2/04571* (2013.01); *B41F 31/005* (2013.01); *B41J 2/04586* (2013.01); *G01N 11/12* (2013.01)

(58) Field of Classification Search
CPC .............................. B41J 2/04571; G01N 11/12
See application file for complete search history.

(56) References Cited

U.S. PATENT DOCUMENTS

2004/0129156 A1 7/2004 Adachi
2005/0146574 A1 7/2005 Adachi
2014/0224139 A1 8/2014 Nadachi et al.

FOREIGN PATENT DOCUMENTS

EP 2657027 A1 10/2013
JP S62-126751 U 8/1987
(Continued)

OTHER PUBLICATIONS

Harada et al., MachineTranslationofJP-2013095053-A, 2013 (Year: 2013).*

(Continued)

*Primary Examiner* — Scott A Richmond
(74) *Attorney, Agent, or Firm* — Manabu Kanesaka; Benjamin Hauptman; Kenneth Berner

(57) ABSTRACT

A viscosity measurement device includes a measurement tool having a pump for feeding a printing liquid by pressure. The viscosity measurement device includes a passage part having a first passage part in which a flow path cross-sectional area for the printing liquid is set at a first area, and a second passage part in which a flow path cross-sectional area for the printing liquid is set at a second area smaller than the first area and which is arranged on an upstream side in a supply direction of the printing liquid with respect to the first passage part, the passage part being interposed in the supply path and arranged upward toward a downstream side in the supply direction of the printing liquid; and a sensor attached to the second passage part and measuring the fall time of the measurement tool in a prescribed vertical region in the second passage part.

15 Claims, 4 Drawing Sheets

(56) References Cited

FOREIGN PATENT DOCUMENTS

| JP | 62-126751 U | * | 11/1987 | |
|---|---|---|---|---|
| JP | H09-39205 A | | 2/1997 | |
| JP | H09-183211 A | | 7/1997 | |
| JP | H09-201949 A | | 8/1997 | |
| JP | 4002859 B2 | | 11/2007 | |
| JP | 2013-95053 A | | 5/2013 | |
| JP | 2013095053 A | * | 5/2013 | ............ B41F 31/005 |
| JP | 2015-13227 A | | 1/2015 | |
| KR | 20140056369 A | | 5/2014 | |

OTHER PUBLICATIONS

Nadachi, MachineTranslationofJP62-126751 U, 1987 (Year: 1987).*
PCT/ISA/210, "International Search Report for International Application No. PCT/JP2018/006464," dated Apr. 10, 2018.
PCT/ISA/237, "Written Opinion of the International Searching Authority for International Application No. PCT/JP2018/006464," dated Aug. 27, 2020.
China Patent Office, "Office Action for Chinese Patent Application No. 201880089441.X," dated Apr. 30, 2021.
Korea Patent Office, "Office Action for Korean Patent Application No. 10-2020-7023417," dated Jun. 18, 2021.

* cited by examiner

PRINTING LIQUID SUPPLY DEVICE, PRINTING LIQUID CIRCULATION DEVICE AND PRINTING MACHINE

RELATED APPLICATIONS

The present application is National Phase of International Application No. PCT/JP2018/006464 filed Feb. 22, 2018, the disclosure of which is hereby incorporated by reference herein in its entirety.

TECHNICAL FIELD

The present case relates to a viscosity measurement device that measures the viscosity of a printing liquid such as ink, an ink supply device provided with the viscosity measurement device, an ink circulation device provided with the ink supply device, a printing machine provided with the ink circulation device, and a printing liquid viscosity adjustment method of adjusting the viscosity of the printing liquid.

BACKGROUND ART

A printing machine is equipped with a device for supplying ink, and a device for causing ink to flow, such as a device for circulating the ink supplied by the ink supply device. When the viscosity of the ink flowing through such a device is inappropriate, the density of the ink transferred to a printing surface also becomes inappropriate, and there is a case where a difference in the density of the printed color results in a defective product.

Therefore, a technique for measuring the viscosity of ink which is used in a printing machine has been developed.

For example, a technique for measuring the viscosity of ink by a measurement device disposed on the upper side toward the downstream side in the supply direction of the ink that is pumped by a pump, in an ink supply path, has been proposed. In this measurement device, a measurement tool is used which is pushed up by the ink which is supplied when the ink supply is performed, and falls when the ink supply is stopped. In an ink supply device with the above-described measurement device incorporated therein, a fall time of the measurement tool in a predetermined vertical area is measured in a state where the ink supply is stopped, and the viscosity of the ink is measured based on the fall time (refer to PTL 1).

CITATION LIST

Patent Literature
[PTL 1] Japanese Unexamined Patent Application Publication No. 09-183211

SUMMARY OF INVENTION

Technical Problem

Incidentally, the longer the fall time of the measurement tool described above is, the more the variation in the measured fall time is suppressed, and an error in the measurement of the viscosity of the ink is also suppressed. Therefore, in order to accurately measure the fall time of the ink, it is conceivable to secure the fall time of the measurement tool by suppressing the cross-sectional area of the ink flow path in a moving area of the measurement tool, that is, by narrowing the gap between the inner wall of the ink supply path and the measurement tool. Further, the cross-sectional area of the ink flow path is suppressed, whereby the force of the ink to push up the measurement tool is increased, and therefore, it is considered that the measurement tool can be reliably pushed up.

However, in a case where the cross-sectional area of the ink flow path in the moving area of the measurement tool is uniformly suppressed, the measurement tool blocks the flow of the pumped ink, and therefore, the pumping efficiency of the ink by the pump is reduced. On the other hand, in a case where the cross-sectional area of the ink flow path in the moving area of the measurement tool is wide, the flow velocity of the ink which is supplied decreases and in a case where the gap between the inner wall of the ink supply path and the measurement tool becomes too wide, the measurement tool cannot be pushed up, and thus there is a concern that the viscosity of the ink may not be measured.

Furthermore, in a case where washing is performed by causing washing water (washing liquid) to flow in the direction opposite to the ink supply direction, if the cross-sectional area of the ink flow path is uniformly suppressed, as in the ink, the flow of the washing water is blocked by the measurement tool, so that a large amount of washing water cannot flow, and thus there is a concern that washing may become difficult.

The problems described above are concerned not only in ink but also in a device that supplies a printing liquid such as a coating liquid or varnish. Therefore, there is room for improvement in achieving both the securement of the accuracy of measuring the viscosity of the printing liquid and the suppression of a decrease in the efficiency of the pump. Further, there is room for improvement in satisfying the easiness of washing.

The present case has been devised in view of the above problems, and one of the objects thereof is to achieve both the securement of the accuracy of measuring the viscosity of a printing liquid and the suppression of a decrease in the efficiency of a pump. Furthermore, one of the objects is to satisfy the easiness of washing. In addition to these objects, the operation and effects which are derived from the respective configurations shown in "Description of Embodiments", which will be described later, and cannot be obtained in the related art can also be positioned as other objects of the present case.

Solution to Problem (1) A viscosity measurement device which is disclosed here includes a measurement tool which, in a supply path of a printing liquid in which a pump for pumping the printing liquid is interposed, is pushed up by the printing liquid when supply of the printing liquid is performed, and falls in the printing liquid when the supply of the printing liquid is stopped, and measuring viscosity of the printing liquid, based on a fall time of the measurement tool.

The viscosity measurement device further includes: a passage part having a first passage portion in which a flow path cross-sectional area for the printing liquid is set to a first area, and a second passage portion in which a flow path cross-sectional area for the printing liquid is set to a second area smaller than the first area and which is disposed upstream of the first passage portion in a supply direction of the printing liquid, the passage part being interposed in the supply path and disposed on an upper side toward a downstream side in the supply direction of the printing liquid; and a sensor which is mounted to the second passage portion and measures the fall time of the measurement tool in a predetermined vertical area in the second passage portion.

(2) An ink supply device which is disclosed here includes: a pump that is interposed in a supply path of a printing liquid and pumps the printing liquid; and a viscosity measurement device interposed in the supply path to measure viscosity of the printing liquid. The viscosity measurement device includes: a passage part having a first passage portion in which a flow path cross-sectional area for the printing liquid is set to a first area, and a second passage portion which is disposed upstream of the first passage portion in a supply direction of the printing liquid and in which a flow path cross-sectional area for the printing liquid is set to a second area smaller than the first area, the passage part being interposed in the supply path and disposed on upper side toward a downstream side in the supply direction of the printing liquid; a measurement tool which is pushed up by the printing liquid when supply of the printing liquid is performed, and falls in the printing liquid when the supply of the printing liquid is stopped; and a measurement part which is mounted to the second passage portion and measures the viscosity of the printing liquid, based on a time that the measurement tool falls in a predetermined vertical area in the second passage portion.

(3) An ink circulation device which is disclosed here includes: the printing liquid supply device described above; and a printing liquid returning device that returns the printing liquid supplied by the printing liquid supply device to the printing liquid supply device again.

(4) A printing machine which is disclosed here includes: the printing liquid circulation device described above; and a printing section that performs printing by using the printing liquid that is circulated by the printing liquid circulation device.

(5) A printing liquid viscosity measurement method which is disclosed here includes: a defoaming step of eliminating bubbles of a printing liquid; and a measurement step of measuring viscosity of the printing liquid with the bubbles eliminated in the defoaming step.

Advantageous Effects of Invention

According to the present case, since the flow path cross-sectional area of the second passage portion is set smaller than that of the first passage portion of the viscosity measurement device, it is possible to achieve both the securement of the accuracy of ink viscosity measurement and the suppression of a decrease in the efficiency of the pump. Furthermore, if the flow path cross-sectional area of the third passage portion is set larger than that of the second passage portion of the viscosity measurement device, the easiness of washing can also be satisfied.

BRIEF DESCRIPTION OF DRAWINGS

In FIG. 1, an ink supply direction is indicated by a black arrow.

In FIG. 2, a direction in which a ball (measurement tool) falls is indicated by a wavy arrow.

In FIG. 3, a washing water supply direction is indicated by a white arrow.

DESCRIPTION OF EMBODIMENTS

Figure 1:
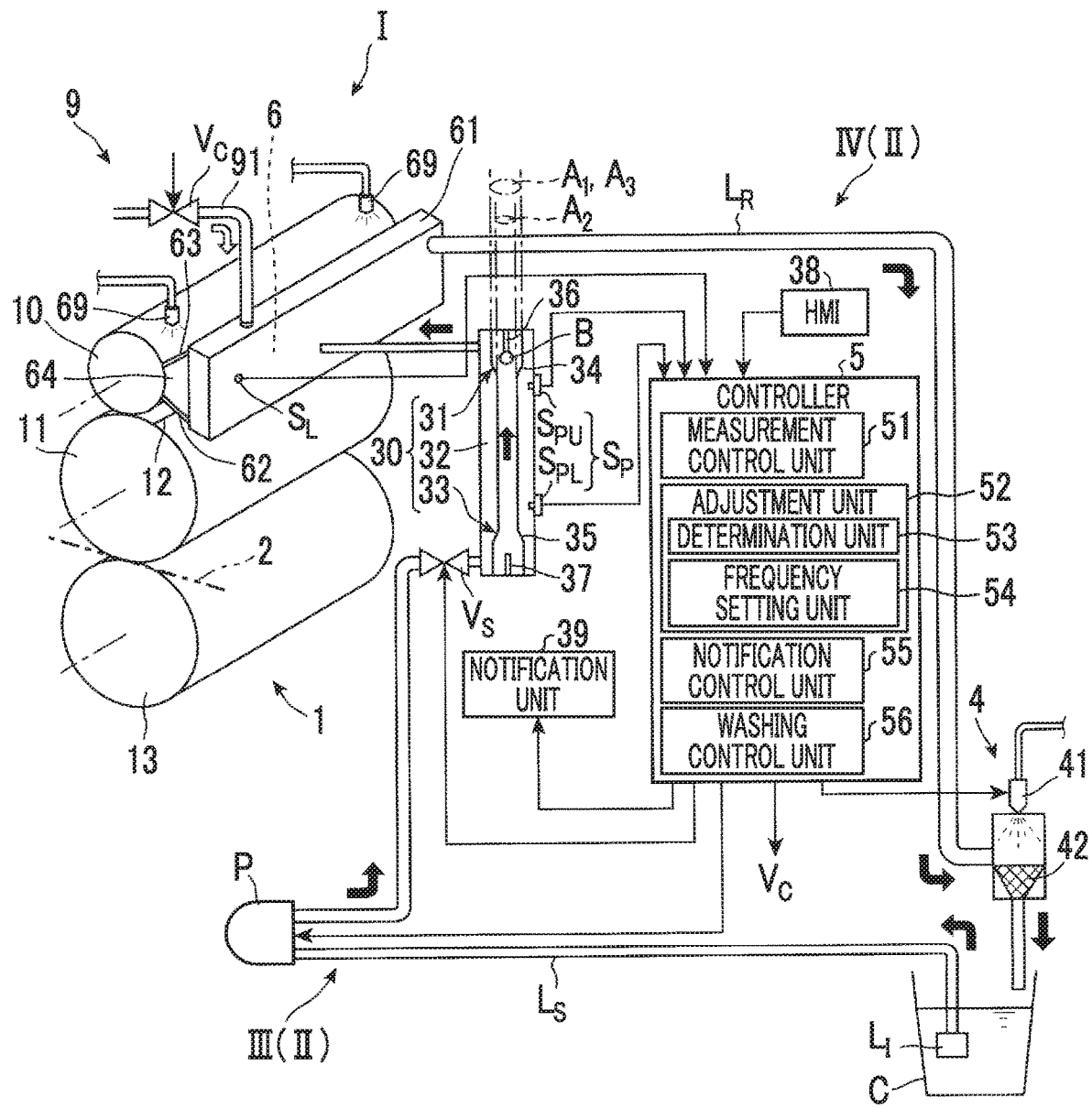
FIG. 1 is a schematic diagram showing an ink circulation device (printing liquid circulation device) in a state of supplying ink (printing liquid) in a printing machine.

Hereinafter, a viscosity measurement device, a printing liquid supply device, a printing liquid circulation device, and a printing machine as an embodiment will be described.

The viscosity measurement device of the present embodiment is a device for measuring the viscosity of a printing liquid such as a coating liquid or varnish as well as ink. The viscosity measurement device is provided in a printing liquid supply device that supplies the printing liquid whose viscosity has been measured. The printing liquid supply device is provided in a printing liquid circulation device that returns the supplied printing liquid to the printing liquid supply device again to circulates it. The printing liquid circulation device is provided in a printing machine including a printing section that performs printing by using the circulating printing liquid.

In the embodiment described below, water-based flexographic ink is given as an example of the printing liquid, and a doctor chamber type flexographic printing machine using this printing liquid is exemplified as the printing machine. This printing machine is used as a unit that performs printing on a corrugated board (printing object) in a box making machine for a corrugated box, and the number of units corresponding to the designed number of colors is used.

However, the printing machine may be a two-roll type or inkpot type flexographic printing machine, or may be a printing machine other than the flexographic printing machine, such as a gravure printing machine or an inkjet printer. Similarly, the printing liquid may be oil-based flexographic ink, or may be ink other than the flexographic ink, such as gravure ink or ink for inkjet.

The flexographic ink or the flexographic printing machine exemplified here is referred to as "ink" or a "printing machine" with the word "flexographic" omitted.

In addition, with respect to the directions which are used in the description of the embodiment, unless otherwise specified, upstream and downstream are defined on the basis of an ink supply direction, the direction in which gravity acts is set to be a downward direction, and the direction opposite to the downward direction is set to be an upward direction.

I. Embodiment

[1. Configuration]
First, a printing machine I will be outlined with reference to FIGS. 1 to 3.

The printing machine I includes a printing section 1 that performs printing by using the supplied ink, and an ink circulation device II that circulates and supplies the ink to the printing section 1.

The ink circulation device II includes an ink supply device III that supplies ink to the printing section 1, and an ink returning device IV that returns the ink supplied by the ink supply device III to the ink supply device III again.

The ink supply device III is provided with a device for measuring the viscosity of ink (hereinafter abbreviated as a "viscosity measurement device") 3, and is also equipped with a control device 5 for performing control regarding the viscosity measurement in a viscosity measurement device 3.

Hereinafter, the respective configurations of the printing section 1, the ink supply device III, and the ink returning device IV will be described in order. Thereafter, the configuration regarding control of ink viscosity measurement will be described.

[1.1. Printing Section]

In the printing section 1, three rolls: an anilox roll 10, a plate cylinder 11, and an impression cylinder 13, are disposed with their axes parallel to each other.

The anilox roll 10 has fine holes or groove cells formed on the surface thereof, and ink is supplied into the cells. The anilox roll 10 is disposed in pressure contact with the plate cylinder 11.

A printing plate 12 is wound around the outer periphery of the plate cylinder 11. The ink supplied into the cells of the anilox roll 10 is transferred to the printing plate 12.

A transport passage for a corrugated board 2 (shown by a dashed-two dotted line in FIGS. 1 and 3) is set between the impression cylinder 13 and the plate cylinder 11 or the printing plate 12. Therefore, the ink transferred to the printing plate 12 is transferred (printed) to the corrugated board 2 in a state where the corrugated board 2 is nipped by the plate cylinder 11 and the impression cylinder 13.

Further, the anilox roll 10 is provided with a chamber for temporarily storing ink, as a configuration for supplying ink into the cells.

The chamber 6 is surrounded by a frame 61 extending along the axis of the anilox roll 10, upper and lower blades 62 and 63, and an end seal 64 at an end portion in an axial direction.

The frame 61 is disposed so as to cover the anilox roll 10 in a horizontal direction.

The doctor blade 62 on one side (here, the lower side), of the blades 62 and 63, scrapes off the ink, and the upper and lower sides of the chamber 6 are closed by the seal blade 63 on the other side (here, the upper side) and the doctor blade 62.

The end seal 64 connects the end portion on the anilox roll 10 side and the end portion on the fixed frame 61 side to close the axial end portion of the chamber 6.

Here, a sponge material is used as the end seal 64. A watering part 69 for sprinkling water (hereinafter, referred to as "dampening water") that damps the end seal 64 in order to prevent the ink in the chamber 6 from soaking and hardening is attached to the end seal 64.

Further, a water level sensor $S_L$ for detecting whether or not the water level of the ink stored in the chamber 6 is lower than a predetermined water level is attached to the frame 61. The "predetermined water level" here is empirically or experimentally set in advance as a water level corresponding to a sufficient ink storage amount for performing printing by the printing section 1. Therefore, the water level sensor $S_L$ can also be called an "ink shortage sensor" that detects whether or not the ink necessary for printing has run out, and a decrease in the availability of the printing machine I due to ink shortage is suppressed.

In addition, a washing mechanism 9 for supplying washing water at the time of ink color change is connected to the chamber 6. In the washing mechanism 9, a valve $V_C$ is interposed in a water supply path 91 for supplying washing water. Here, the washing water with the original pressure applied thereto is supplied to the water supply path 91. At the time of washing, the valve $V_C$ is opened and the washing water is supplied to the chamber 6. At other times, the valve $V_C$ is closed and the supply of the washing water to the chamber 6 is stopped.

[1.2. Ink Supply Device]

The ink supply device III is a device that supplies the ink stored in an ink can C (a storage part) to the chamber 6 described above.

The ink supply device III is provided with an ink supply path $L_S$. In the supply path $L_S$, an intake port $L_I$ at an upstream end portion is immersed in the ink in the ink can C, and a downstream end portion penetrates the frame 61 to communicate with the chamber 6.

The supply path $L_S$ is provided with a pump P for pumping the ink, a valve $V_S$ (an on-off valve) for switching the flow state of the ink, and the viscosity measurement device 3 for measuring the viscosity of the ink. The pump P, the valve $V_S$, and the viscosity measurement device 3 are disposed in series in this order from the upstream toward the downstream.

When the ink is supplied to the chamber 6, the ink is pumped by the pump P in a state where the valve $V_S$ is opened. At the time of measuring the viscosity of the ink, a state is created where the pumping of the ink by the pump P is stopped and the valve $V_S$ is closed. When washing the ink, the pumping operation of the pump P is stopped in a state where the valve $V_S$ is opened, and the valve $V_C$ of the washing mechanism 9 described above is opened, so that the washing water flows from the chamber 6 to the ink can C.

Hereinafter, the viscosity measurement device 3 will be described in detail.

The viscosity measurement device 3 is provided with a passage part 30 through which the ink whose viscosity is to be measured flows.

The passage part 30 forms a part of the supply path $L_S$ and is disposed on the upper side toward the downstream side. For example, in the passage part 30 disposed along the vertical direction, the upstream-side end portion is disposed at a lower end portion and the downstream-side end portion is disposed at a upper end portion.

A measurement tool B which floats in the ink, as a member for measuring the viscosity of the ink, is built in the passage part 30. Here, a ball is used as the measurement tool B (for this reason, in the following description, the "measurement tool B" is referred to as a "ball B"). That is, the viscosity measurement device 3 measures the viscosity of the ink by a ball falling method.

The ball B is pushed up by the ink when the pump P performs pumping (when the supply is performed), and falls in the ink when the pumping operation of the pump P is stopped (when the supply is stopped). In other words, the ball B has larger specific gravity than the ink, and is set to specific gravity taking into account the discharge performance of the pump P corresponding to the pushing-up force of the ink flowing upward in the passage part 30.

Further, in the passage part 30, the cross-sectional area of the ink flow path is not uniformly set, and the passage part 30 is roughly divided into three passage portions 31, 32, and 33 listed below, according to the sizes of areas $A_1$, $A_2$, and $A_3$ set as the flow path cross-sectional areas, and the positions in an up-down direction.

Upper passage portion 31 (first passage portion): The flow path cross-sectional area thereof is set to the first area $A_1$.

It is disposed at an upper portion (downstream) of the passage part 30.

Intermediate passage portion 32 (second passage portion): The flow path cross-sectional area thereof is set to the second area $A_2$.

It is disposed at an intermediate portion in the up-down direction of the passage part 30.

Lower passage portion 33 (third passage portion): The flow path cross-sectional area thereof is set to the third area $A_3$.

It is disposed at a lower portion (upstream) of the passage part 30.

The areas $A_1$, $A_2$, and $A_3$ of the passage portions 31, 32, and 33 described above are set larger than the projected area of the ball B. The sizes of the areas $A_1$, $A_2$, and $A_3$ are set in this manner, whereby the movement of the ball B in the passage part 30 is guaranteed.

Figure 2:
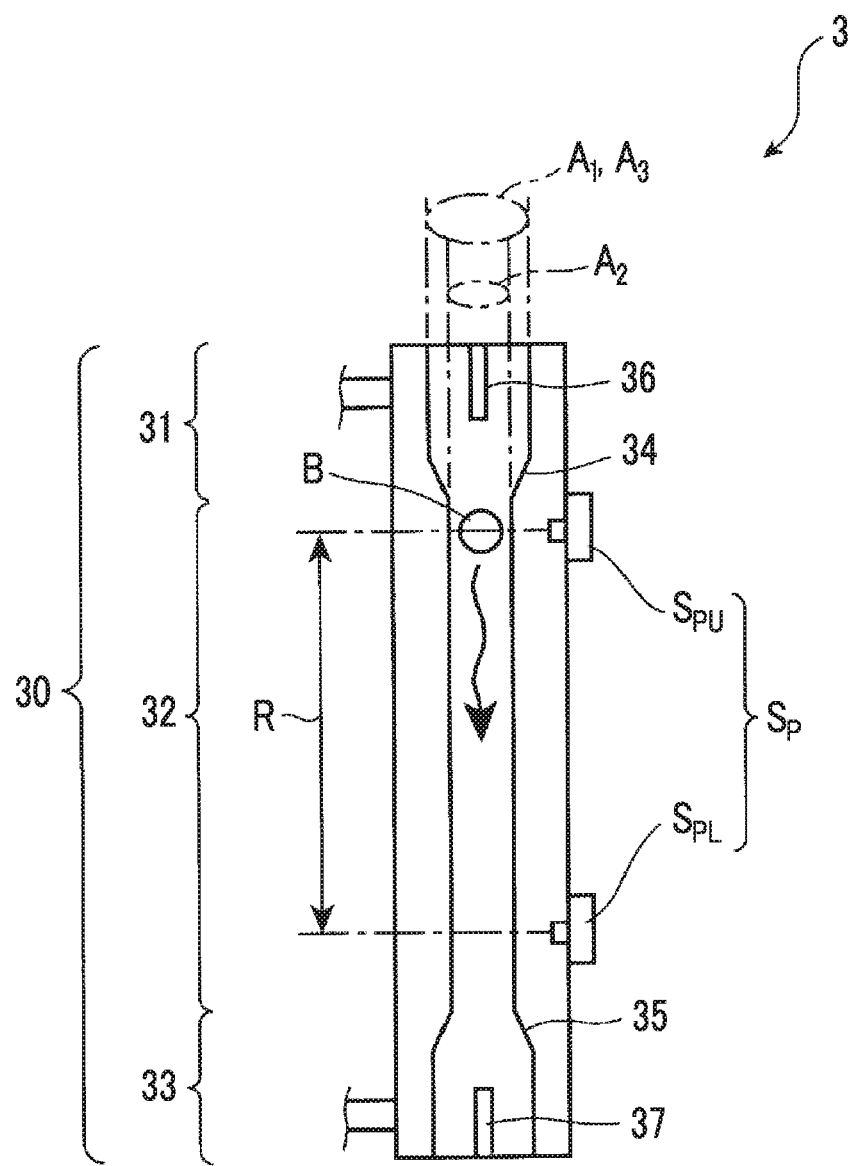
FIG. 2 is a schematic diagram showing a viscosity measurement device in a state of measuring the viscosity of ink.
Figure 3:
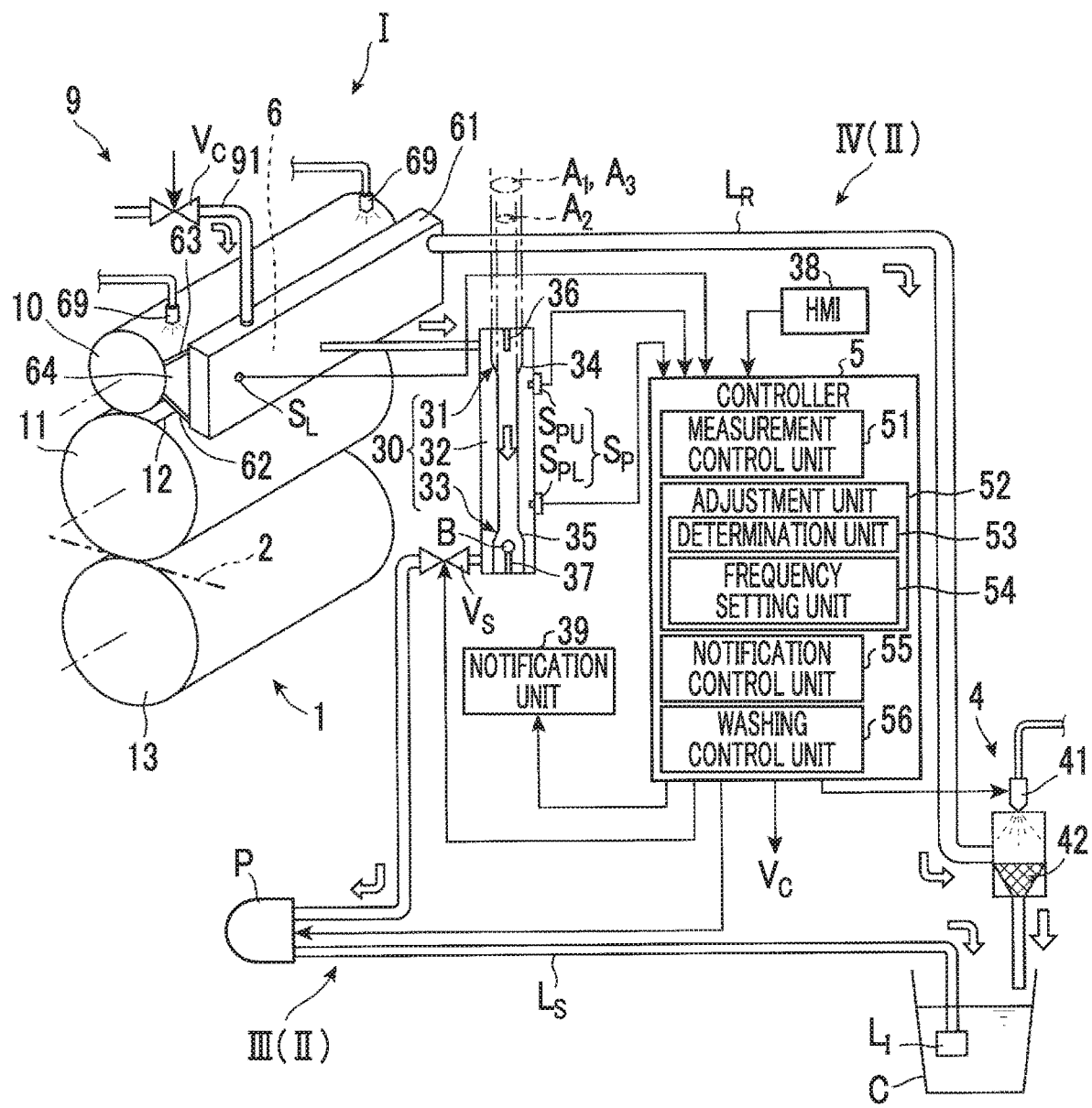
FIG. 3 is a schematic diagram showing the ink circulation device in a state of washing ink in a printing machine.

In order to restrain the ball B from moving from the passage part 30 to the upstream side or the downstream side, a stopper 36 is provided in the upper passage portion 31 and a stopper 37 is also provided in the lower passage portion 33. In FIGS. 1 to 3, rod-shaped members are exemplified as the stoppers 36 and 37. However, as the stoppers 36 and 37, various members for restricting the movement to the outside of the passage part 30 can be used, and a planar member such as a mesh filter or a strainer may be adopted.

When the ink is supplied to the chamber 6, the pushed-up ball B is located in the upper passage portion 31 with the movement thereof restricted with the stopper 36 (refer to FIG. 1). When the viscosity of the ink is measured, the ball B falls in the ink from the upper passage portion 31 through the intermediate passage portion 32 to the lower passage portion 33 (refer to FIG. 2). When washing the ink, the ball B pushed down by the washing water is located in the lower passage portion 33 with the movement thereof restricted by the stopper 37 (refer to FIG. 3).

The second area $A_2$ of the intermediate passage portion 32 is set smaller than the areas $A_1$ and $A_3$ of the upper and lower passage portions 31 and 33 ($A_2 < A_1, A_3$). Further, the first area $A_1$ and the third area $A_3$ are set to be equal to each other ($A_1 = A_3$). The relationship between the first area $A_1$ and the third area $A_3$ is not limited to this.

Here, an enlarged diameter passage portion 34 in which the flow path cross-sectional area thereof continuously increases from the second area $A_2$ to the first area $A_1$ as it goes toward the upper side (downstream side) from the upper end (downstream end) of the intermediate passage portion 32 is provided in the upper passage portion 31. Further, a reduced diameter passage portion 35 in which the flow path cross-sectional area thereof continuously decreases from the third area $A_3$ to the second area $A_2$ as it goes toward the intermediate passage portion 32 is provided in the lower passage portion 33.

Further, the size of the second area $A_2$ is suppressed such that the ball B can be appropriately pushed up by the pumping operation of the pump P and the time for the ball B to fall in the ink when the pumping operation of the pump P is stopped is secured. In other words, a structure is formed in which the intermediate passage portion 32 is narrower than the upper passage portion 31 and the lower passage portion 33.

The first area $A_1$ is set larger than the second area $A_2$ such that the ink which is supplied is not blocked by the ball B when the ball B is located in the upper passage portion 31. Similarly, the third area $A_1$ is set larger than the second area $A_2$ such that the washing water which is supplied is not blocked by the ball B when the ball B is located in the lower passage portion 33.

For example, the area obtained by subtracting the projected area of the ball B from the first area $A_1$ or the third area $A_3$ is set to be equal to the second area $A_2$. The areas $A_1$, $A_2$, and $A_3$ is set in this way, whereby when the ball B is located in the upper passage portion 31 or the lower passage portion 33, the size of a space (substantial flow path cross-sectional area) in which the ink or the washing water flows through the upper passage portion 31 or the lower passage portion 33 can be matched with the size of the flow path cross-sectional area in which the ink or the washing water flows through the intermediate passage portion 32. Therefore, in the upper passage portion 31 or the lower passage portion 33, the flow of the ink or the washing water is not blocked by the ball B.

A proximity sensor $S_P$ for measuring the fall time of the ball B is mounted to the intermediate passage portion 32 whose flow path cross-sectional area is suppressed to the second area $A_2$.

The proximity sensor $S_P$ is a non-contact detector that detects that the ball B has approached. As the proximity sensor $S_P$, an upper sensor $S_{PU}$ mounted to the upper portion of the intermediate passage portion 32 and a lower sensor $S_{PL}$ mounted to the lower portion of the intermediate passage portion 32 are disposed to be separated up and down from each other.

The approach of the ball B falling in the intermediate passage portion 32 when measuring the viscosity of the ink is first detected by the upper sensor $S_{PU}$ and then detected by the lower sensor $S_{PL}$. The fall time of the ball B in a predetermined vertical area R whose upper and lower end portions are respectively defined by the upper sensor $S_{PU}$ and the lower sensor $S_{PL}$ is measured from the elapsed time from the point in time of the detection by the upper sensor $S_{PU}$ to the point in time of the detection by the lower sensor $S_{PL}$.

[1.3. Ink Returning Device]

The ink returning device IV is connected to the ink supply device III described above through the ink can C and the chamber 6, and returns the ink supplied by the ink supply device III to the ink supply device III again. The ink supply device III and the ink returning device IV circulate the ink and configure the ink circulation device II.

The ink returning device IV is provided with an ink return path $L_R$. The return path $L_R$ has an upstream end portion that penetrates the frame 61 and communicates with the chamber 6, and a downstream end portion that is disposed so as to discharge the ink toward the ink can C.

The upstream end portion of the return path $L_R$ communicates with the chamber 6 through a through-hole of the chamber 6 formed above the water level sensor $S_L$. The ink that overflows into the through-hole flows through the return path $L_R$.

Incidentally, since the ink in the chamber 6 is agitated by the anilox roll 10 which rotates, there is a concern that the ink may foam. In particular, in a high-speed printing machine I, the rotation speed of the anilox roll 10 is also high, and thus the ink becomes easy to foam. Further, the bubbled ink has a reduced force for pushing up the ball B, so that the ball B does not appropriately reach the upper passage portion 31, or the resistance of the ink decreases, so that the fall time of the ball B in the predetermined vertical area R cannot be measured appropriately.

Therefore, a defoaming device 4 for eliminating bubbles of ink is provided.

The defoaming device 4 is interposed in the return path $L_R$.

The defoaming device 4 is provided with two kinds of defoaming means. One is a nozzle 41 that injects water droplets as an defoaming agent, and the other is a mesh filter 42. The bubbles of the ink flowing through the return path $L_R$ are filtered and collected by the filter 42, and the water droplets injected from the nozzle 41 burst the collected bubbles.

Here, in order to simplify the configuration of the defoaming device 4, an injection valve capable of switching between injection and stop of the injection is used as the nozzle 41. However, a nozzle head that simply injects the supplied water is used as the nozzle 41, and an on-off valve is interposed in the supply path of the water to be injected, so that a water droplet injection mechanism and a mechanism for switching between the injection of the water droplets and the stop of the injection may be provided separately.

[1.4. Control regarding Ink Viscosity Measurement]

Next, the control regarding the ink viscosity measurement will be described.

The control device 5 is provided as a configuration for performing such control. The control device 5 is configured as an LSI device or an embedded electronic device, in which a microprocessor, a ROM (Read Only Memory), a RAM (Random Access Memory), and the like are integrated.

A configuration of an input system that acquires information necessary for control, and a configuration of an output system that is a control target are connected to the control device 5. Specifically, the configuration of the input system is connected to the control device 5 so as to be able to input information to the control device 5, and the configuration of the output system is connected to the control device 5 so as to be able to output information from the control device 5.

The configuration of the input system acquires information necessary for the control regarding the ink viscosity measurement, and inputs such information to the control device 5. The control device 5 generates a control signal regarding the ink viscosity measurement, based on various information input from the configuration of the input system, and outputs the control signal to the configuration of the output system. The configuration of the output system operates according to the control signal output from the control device 5.

Hereinafter, the configuration of the input system and the configuration of the output system will be described in this order, and then the control device 5 as the configuration of a control system will be described.

—Configuration of Input System—

The configuration of the input system includes various sensors $S_L$, $S_{PU}$, and $S_{PL}$ described above.

Further, as the configuration of the input system, an HMI (Human Machine Interface) 38 which is operated by an operator of the printing machine I is provided. The HMI 38 is a device for manually inputting or setting a request for the viscosity measurement or various parameters regarding the viscosity measurement. For example, switches, buttons, a touch panel, or the like is used for the HMI 38.

—Configuration of Output System—

The configuration of the output system includes the valves $V_S$ and $V_C$, the pump P, and the nozzle 41 described above.

Further, as the configuration of the output system, a notification unit 39 that notifies the operator of the printing machine I of information is provided. The notification unit 39 is a device for giving notice of information regarding the control of the viscosity measurement. For example, a display or a buzzer is used for the notification unit 39.

—Control Device (Configuration of Control System)—

The control device 5 performs control of measuring the viscosity of the ink from the fall time of the ball B, control of adjusting the viscosity, based on the measured viscosity, and control of notifying the operator of the information acquired in these controls. In addition, the control device 5 also performs control of performing washing at the time of ink color exchange.

The control device 5 includes a measurement control unit 51, an adjustment unit 52, a notification control unit 55, and a washing control unit 56, as functional elements that performs various controls described above. Further, the adjustment unit 52 includes a determination unit 53 and a frequency setting unit 54.

The functional elements described above represent some of the functions of the program which is executed by operation assisting control, and are realized by software. However, some or all of the functional elements may be realized by hardware (electronic circuit), or may be realized by using software and hardware together.

<Measurement Control Unit>

The measurement control unit 51 performs measurement control of measuring the viscosity of the ink, start control of performing pretreatment of the measurement control, and end control of performing posttreatment of the measurement control.

The start control is performed in a case where a measurement condition is satisfied. In a case where the measurement condition is not satisfied, the start control is not performed.

Hereinafter, each control will be described in the order of the start control, the measurement control, and the end control.

The "measurement condition" here is satisfied when the following conditions A1 and A2 are satisfied, and is not satisfied otherwise.

Condition A1: The detection result by the water level sensor $S_L$ must be equal to or greater than a predetermined water level.

Condition A2: The ink viscosity measurement is required.

The condition A1 is a requirement on the premise of the ink viscosity measurement that sufficient ink is stored in the chamber 6 for performing printing by the printing machine I.

The condition A2 is a requirement set in order to avoid unnecessary measurement, and is satisfied after the elapse of a period set by the frequency setting unit 54, the details of which will be described later, or when the ink viscosity measurement is required by the operator through the HMI 38.

In the start control which is executed when the conditions A1 and A2 described above are satisfied, the pump P is stopped and the valve $V_S$ is closed. From the viewpoint of simplifying the control, it is preferable that the point in time of the stop of the pump P and the point in time of the closing of the valve $V_S$ are the same point in time, and from the viewpoint of suppressing the load on the pump P, it is preferable that the point in time of the closing of the valve $V_S$ is set after the stop of the pump P.

However, if the period (opening period) after the pump P is stopped and until the valve $V_S$ is closed is prolonged, the ball B is pushed by the ink which flows down, and thus the ink viscosity measurement may become impossible. Therefore, it is preferable that the valve $V_S$ is closed immediately after the pump P is stopped.

In the measurement control, measuring control of measuring the fall time of the ball B in the predetermined vertical area R is performed based on the detection information from the proximity sensor $S_P$, and acquisition control of acquiring the viscosity of the ink from the fall time measured in the measuring control is performed.

In the measuring control, the elapsed time from the point in time of the detection of the ball B by the upper sensor $S_{PU}$ to the point in time of the detection of the ball B by the lower sensor $S_{PL}$ is measured as the fall time of the ball B in the predetermined vertical area R.

In the acquisition control, the viscosity is acquired from the fall time of the ball B measured in the measuring control by the methods exemplified below.

Method 1: To calculate a calculation formula for calculating the viscosity of the ink by using the fall time of the ball B as a function Method 2: To read from a map in which the fall time of the ball B and the viscosity of the ink are associated with each other In a case of using the method 1 described above, the calculation formula in the method 1 is stored in the measurement control unit 51 in advance, and the fall time measured in the measuring control is substituted into the function of the calculation formula to calculate the viscosity of the ink. Various known calculation formulas can be used as the calculation formula here.

In a case of using the method 2 described above, the map in the method 2 is stored in the measurement control unit 51 in advance, and the viscosity of the ink associated with the fall time measured in the measuring control is read from the map.

The elements that measure the viscosity of the ink, as described above, are the proximity sensor $S_P$ including the upper sensor $S_{PU}$ and the lower sensor $S_{PL}$, and the measurement control unit 51. The proximity sensor $S_P$ and the measurement control unit 51 configure a measurement part that measures the viscosity of the ink.

However, a configuration may be made in which the function of measuring the viscosity of the ink (the function of performing the measuring control and the acquisition control) in the measurement control unit 51 is mounted on the proximity sensor $S_P$ and the information on the viscosity of the ink measured by the proximity sensor $S_P$ is input to the control device 5.

In the end control, the end of the measurement control is determined as the start condition thereof. That is, the end control is performed after the viscosity of the ink is measured by the measurement control.

In the end control, contrary to the start control, the valve $V_S$ is opened and the pump P is driven.

From the viewpoint of simplifying the control, it is preferable that the point in time of the driving of the pump P and the point in time of the opening of the valve $V_S$ are the same point in time, and from the viewpoint of suppressing the load on the pump P, it is preferable that the point in time of the driving of the pump P is set after the opening of the valve $V_S$. However, if the period after the valve $V_S$ is opened and until the pump P is driven is prolonged, the ink flows down from the chamber 6, and thus the amount of ink in the chamber 6 may decrease. Therefore, it is preferable that the pump P is driven immediately after the valve $V_S$ is opened.

<Adjustment Unit>

Incidentally, in the printing machine I, if the evaporation of the ink progresses in the anilox roll 10 or the ink can C, the viscosity of the ink may increase. On the other hand, if the dampening water enters the chamber 6 through the end seal 64, the viscosity of the ink may decrease. Since the viscosity of the ink can fluctuate in this way, the adjustment unit 52 that adjusts the viscosity of the ink is provided.

The adjustment unit 52 performs adjustment control of adjusting the viscosity, based on the viscosity of the ink measured by the measurement control unit 51, determination control of determining a measured ink level, and frequency setting control of setting a ink viscosity measurement frequency. The determination control is performed by the determination unit 53, and the frequency setting control is performed by the frequency setting unit 54.

The adjustment control is performed if the acquisition control (measurement control) ends.

This adjustment control is based on the premise that the determination control is performed by the determination unit 53, and thereafter, the adjustment control is performed by the adjustment unit 52.

In the determination control, whether or not the viscosity of the ink is within a predetermined viscosity range is determined.

The "predetermined viscosity range" here is an ink viscosity range in which printing by the printing machine I can be appropriately performed, and is set experimentally or empirically in advance.

However, in the determination control, a predetermined viscosity (value) may be used instead of the predetermined viscosity range. In this case, the optimum ink viscosity for printing by the printing machine I is set in advance as the predetermined viscosity, and whether or not the measured ink viscosity is the predetermined viscosity is determined.

The adjustment control is performed in a case where in the determination control, it is determined that the viscosity of the ink is outside the predetermined viscosity range. Here, an example will be given in which the adjustment control is performed in a case where it is determined that the measured ink viscosity is higher than the predetermined viscosity range.

In this adjustment control, water is added to the ink to reduce the viscosity. Here, an adjustment control of controlling the nozzle 41 of the defoaming device 4 to add water to the ink is exemplified. That is, adjustment control in which water, which is a defoaming agent, is also used as a viscosity adjusting agent for adjusting the viscosity of ink is shown as a specific example. Generally speaking, a defoaming agent is used as the viscosity adjusting agent for adjusting the viscosity of the ink, and the defoaming device 4 is used as the adjustment mechanism.

The frequency setting control sets a frequency at which the viscosity of the ink is measured again according to the determination result in the determination control.

In this frequency setting control, an example will be given in which in a case where in the determination control, it is determined that the viscosity of the ink is within the predetermined viscosity range, first frequency setting control is performed, and in a case where the adjustment control is performed (here, in a case where it is determined that the viscosity of the ink is higher the predetermined viscosity range), second frequency setting control is performed.

In the first frequency setting control, a first period $T_1$ is set as a period until the next ink viscosity measurement, and after the elapse of the first period $T_1$, first measurement for measuring the viscosity of the ink again is performed. In the second frequency setting control, a second period $T_2$ longer than the first period $T_1$ is set as a period until the next ink viscosity measurement ($T_2 > T_1$), and after the elapse of the second period $T_2$, second measurement for measuring the viscosity of the ink again is performed.

That is, in a case where the measured ink viscosity is within the predetermined viscosity range, the viscosity of the ink is not adjusted and the frequency of measuring the viscosity of the ink is set low (the measurement interval is long). On the other hand, in a case where the viscosity of the ink is adjusted, the frequency of measuring the viscosity of the ink is set high (the measurement interval is short).

In a case where in the determination control, it is determined that the viscosity of the ink is lower than the predetermined viscosity range, stop control of stopping the ink viscosity measurement or the printing is performed. The stop of the ink viscosity measurement or the printing by the stop control is notified to the operator by notification control (described below) prior to the execution of the stop control.

<Notification Control Unit>

The notification control unit 55 performs the notification control of notifying the operator of the printing machine I of various information regarding the ink viscosity measured in the measurement control.

The notification control unit 55 performs viscosity notification control of giving notice of the ink viscosity measured in the measurement control, and stop notification control of giving notice of the stop of an adjustment notification step of giving notice of the viscosity adjustment in a case where it is determined that the viscosity of the ink is outside the predetermined viscosity range, or the stop of the printing. For example, in the adjustment notification step, the fact that the viscosity is adjusted is notified. Further, in the stop notification control, a buzzer included in the notification unit 39 is caused to ring, or a display included in the notification unit 39 displays the fact that the viscosity measurement or the printing is stopped.

In addition, the notification control unit 55 performs history notification control of displaying a history of the measured viscosity, or notification control of displaying the product number or model number of the ink whose viscosity is to be measured and the appropriate viscosity of the ink in association with each other, or displaying the ink related to the printing order and the appropriate viscosity thereof in association with each other.

<Washing Control Unit>

The washing control unit 56 performs washing control of washing the ink at the time of an ink color exchange.

The washing control is performed in a case where a washing condition is satisfied. In a case where the washing condition is not satisfied, the washing control is not performed. The "washing condition" here is satisfied when an ink color exchange is required or when the operation stop of the printing machine I is required. For example, when the ink color exchange or the stop of the printing machine I is required from the operator through the HMI 38, or the like, the washing condition is satisfied.

In this washing control, the valve $V_S$ of the supply path $L_S$ is opened, the pump P is rotated in the direction opposite to that when the ink is supplied, and then the valve $V_C$ of the water supply path 91 is opened.

<Other>

Hereinafter, a process (method) of each control described above will be referred to by a name obtained by replacing the word "control" at the end of the name of each control with "steps". For example, the measurement control is referred to as a "measurement step", and the frequency setting control is referred to as a "frequency setting step". Since in the adjustment control described above, the defoaming agent also serves as the viscosity adjusting agent, the adjustment control can also be referred to as defoaming control, and this step can also be referred to as a defoaming step.

[2. Flowchart]

Figure 4:
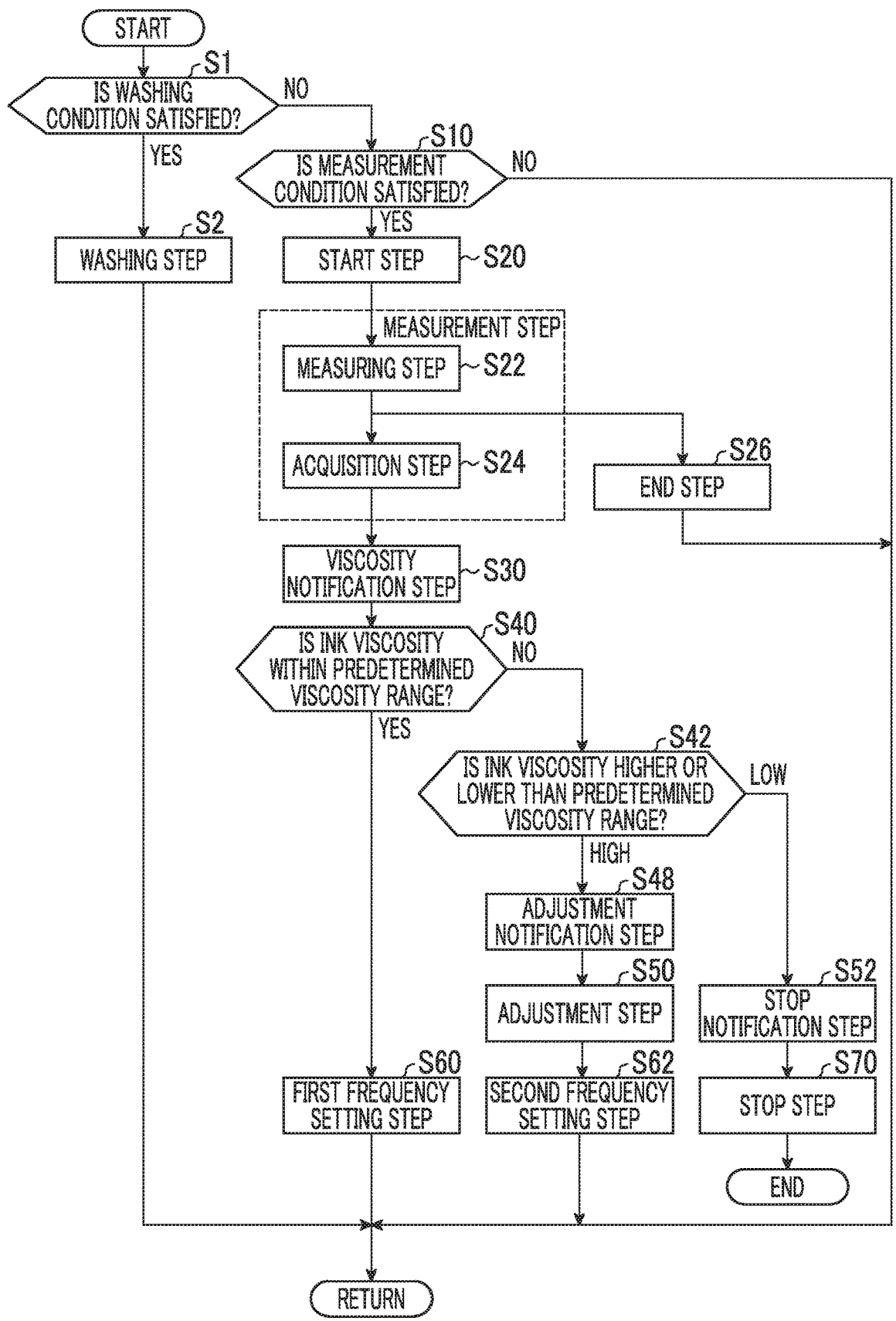
FIG. 4 is a flowchart showing a procedure of control regarding ink viscosity measurement.

Next, a procedure of the control regarding the ink viscosity measurement will be described with reference to the flowchart of FIG. 4.

This procedure is repeatedly performed at a predetermined control cycle in the printing machine I. This procedure is performed under the condition that the printing machine I is running.

First, whether or not the washing condition is satisfied is determined (step S1).

In a case where it is determined that the washing condition is satisfied, the washing step is performed (step S2).

In a case where it is determined that the washing condition is not satisfied, whether or not the measurement condition is satisfied is determined (step S10). In a case where the measurement condition is not satisfied, this control cycle ends (return).

In a case where the measurement condition is satisfied, after the pretreatment for the ink viscosity measurement by performing the start step (step S20), the measurement step including the measuring step and the acquisition step is performed (steps S22 and S24). If the measuring step ends, the posttreatment of the ink viscosity measurement is performed by the end step which is performed in parallel with the acquisition step (step S26), and this control cycle ends (return).

After the viscosity of the ink is measured in the measurement step, a viscosity notification step of giving notice of the measured viscosity is performed (step S30).

Then, the determination step is performed (steps S40 and S42). In this determination step, whether or not the ink viscosity measured in the measurement step is within a predetermined viscosity range is determined (step S40), and thereafter, whether or not the viscosity is higher than the predetermined viscosity range is determined (step S42)).

In a case where it is determined that the viscosity of the ink is within the predetermined viscosity range, the first frequency setting step is performed (step S60). On the other hand, in a case where it is determined that the viscosity of the ink is higher than the predetermined viscosity range, the adjustment notification step is performed (step S48), and thereafter, the adjustment step is performed (step S50), and then the second frequency setting step is performed (step S62).

In this way, if the measured ink viscosity is within the predetermined viscosity range, the viscosity measurement frequency is set low (the measurement interval is long) without adjusting the viscosity of the ink. On the other hand, if the measured ink viscosity is higher than the predetermined viscosity range, the viscosity of the ink is adjusted and then the viscosity measurement frequency is set high (the measurement interval is short).

The ink viscosity measurement method (the printing liquid viscosity measurement method) has at least the measurement step and adjustment step (defoaming step) described above, and preferably has the first frequency measurement step or the second frequency measurement step.

In a case where it is determined that the viscosity of the ink is lower than the predetermined viscosity range, the stop notification step is performed (step S52), and the stop control is performed (step S70). Then, the control regarding the ink viscosity measurement ends (END).

The end step described above can be performed at any timing after the end of the measuring step. Further, the viscosity notification step described above can be performed at any timing after the end of the acquisition step (measurement step).

[3. Operation and Effects]

Since this embodiment is configured as described above, the following operation and effects can be obtained.

(1) In the viscosity measurement device 3 for measuring the viscosity of ink, the second area $A_2$ (flow path cross-sectional area) of the intermediate passage portion 32 in which the ball B falls is smaller than the first area $A_1$ (flow path cross-sectional area) of the upper passage portion 31. Therefore, when the ink is supplied, the force of the ink to push up the ball B becomes large, and thus the ball B can be pushed up reliably. Further, when the viscosity of the ink is measured, it is possible to suppress measurement with variation in the fall time of the ball B, and it is possible to enhance the accuracy of measuring the viscosity of the ink.

Conversely, the first area $A_1$ (flow path cross-sectional area) of the upper passage portion 31 in which the ball B is located when the ink is supplied is larger than the second area $A_2$ (flow path cross-sectional area) of the intermediate passage portion 32. Therefore, it is possible to reduce the blocking of the ink by the balls B when the supply is performed, and it is possible to suppress a decrease in the efficiency of the pump.

As a result, it is possible to achieve both the securement of the accuracy of the ink viscosity measurement and the suppression of a decrease in the efficiency of the pump.

(2) Further, the upper passage portion 31 is provided with the enlarged diameter passage portion 34 whose flow path cross-sectional area continuously increases from the second area $A_2$ to the first area $A_1$ as it goes upward from the upper end of the intermediate passage portion 32. Therefore, the flow velocity of the ink which is supplied gradually decreases in the enlarged diameter passage portion 34, and the moving speed of the ball B which is pushed up to the upper passage portion 31 also gradually decreases. Therefore, the collision load of the ball B on the upper passage portion 31 is suppressed, and thus the durability of the viscosity measurement device 3 can be improved.

(3) Since the viscosity measurement device 3 and the pump P are disposed in series, it is possible to suppress an increase in ink loss or an increase in washing water due to the viscosity measurement device 3.

In a case where the viscosity measurement device is disposed in parallel with the pump, a pipe or a valve for branching or merging the ink which is supplied to cause the ink to flow to the viscosity measurement device is required, and thus the loss of the ink which is supplied may increase accordingly, or more washing water may be required. In contrast, according to the ink supply device III, it is possible to reduce the loss of ink or an increase of washing water, and it is also possible to suppress an increase in the number of pipes or valves and simplify the configuration.

Further, since the viscosity measurement device 3 is disposed on the downstream side of the pump P, the flow of the ink that is about to flow down through the viscosity measurement device 3 can be suppressed by the stopped pump P. Therefore, it contributes to enhance the accuracy of the ink viscosity measurement.

(4) By closing the valve $V_S$ interposed in the supply path $L_S$ when the viscosity of the ink is measured by the viscosity measurement device 3, it is possible to reliably suppress the flow of the ink whose viscosity is measured. As a result, the viscosity of the ink can be accurately measured.

Further, since the valve $V_S$ is disposed on the upstream side of the viscosity measurement device 3, the flow of the ink that is about to flow down (backflow) to the upstream side through the viscosity measurement device 3 is reliably suppressed. Therefore, it is possible to enhance the accuracy of the ink viscosity measurement.

(5) Further, the third area $A_3$ (flow path cross-sectional area) of the lower passage portion 33 is larger than the second area $A_2$ (flow path cross-sectional area) of the intermediate passage portion 32. Therefore, it is possible to reduce the blocking of the washing water at the time of water supply by the ball B, allow a large amount of washing water to flow, enhance the washing efficiency, and facilitate the washing.

Further, the lower passage portion 33 is provided with the reduced diameter passage portion 35 whose flow path cross-sectional area continuously decreases from the third area $A_3$ to the second area $A_2$ as it goes toward the intermediate passage portion 32. Therefore, the flow velocity of the ink which is supplied gradually increases in the reduced diameter passage portion 35 as it goes upward in the lower passage portion 33. Therefore, the ball B in the lower passage portion 33 can be reliably pushed up. In other words, it is possible to prevent the ink viscosity from becoming unmeasurable because the ball B is not pushed up from the lower passage portion 33. In this way, the viscosity of the ink can be reliably measured.

Conversely, according to the reduced diameter passage portion 35, the flow path cross-sectional area continuously increases from the second area $A_2$ to the third area $A_3$ as it goes downward at the upper portion of the lower passage portion 33. Therefore, the flow velocity of the washing water gradually decreases in the reduced diameter passage portion 35, and thus the moving speed of the ball B which is pushed down can also gradually decrease. Therefore, the collision load of the ball B on the lower passage portion 33 is suppressed, and thus the durability of the viscosity measurement device 3 can be improved.

(6) Alternatively, even if bubbles occur in the ink whose viscosity is to be measured, the bubbles are defoamed by the defoaming device 4. Also from this point, the accuracy of the ink viscosity measurement can be enhanced.

Further, in the defoaming device 4, since water as the defoaming agent is injected from the nozzle 41, the ink can be reliably defoamed. Such reliable defoaming contributes to improvement in the accuracy of the ink viscosity measurement.

(7) In addition, according to the adjustment control, the viscosity of the ink is automatically adjusted after whether the viscosity is high or low is determined by the determination control. Therefore, the viscosity of the ink can be automatically adjusted appropriately, and the appropriate viscosity of the ink can be maintained.

In this adjustment control, since the defoaming agent also serves as a viscosity adjusting agent and the defoaming device 4 also serves as an adjustment mechanism for adjusting the viscosity, it is not necessary to separately prepare the viscosity adjusting agent and the defoaming agent, and thus the configuration can be simplified.

(8) According to the frequency setting control, in a case where the viscosity of the ink is adjusted, the measurement interval is set short. Therefore, the viscosity of the ink can be quickly measured after the viscosity of the ink is adjusted, and it is also possible to notify the operator of the viscosity by the viscosity notification control.

On the other hand, in a case where the measured ink viscosity is within the predetermined viscosity range, the measurement interval is set long without adjusting the viscosity of the ink. Therefore, unnecessary viscosity adjustment or viscosity measurement can be suppressed, which contributes to stable operation of the ink supply device III or the ink returning device IV.

(9) In addition, since the ink returning device IV for returning the ink supplied by the ink supply device III to the ink supply device III again is provided, the ink can be used without waste.

The ink that may generate bubbles due to the rotation of the anilox roll 10 flows from the chamber 6 to the ink returning device IV. In this manner, the defoaming device 4 is disposed in the ink returning device IV through which the ink immediately after foaming can flow, whereby the ink can be efficiently defoamed. Also from this point, it is possible to improve the accuracy of the ink viscosity measurement.

(10) According to the printing machine I that performs printing by using the ink whose viscosity measurement accuracy is secured as described above, the printing quality can be secured.

II. Modification Examples

The embodiment described above is merely exemplification, and is not intended to exclude application of various modifications or techniques that are not clearly shown in this embodiment. Each configuration of this embodiment can be variously modified and implemented within a scope which does not depart from the gist thereof. Further, the configurations can be selected as necessary and can also be combined appropriately.

—Modification Example Regarding Ink Viscosity Adjustment—

In the adjustment control of adjusting the viscosity of the ink, in a case where the measured ink viscosity is lower than the predetermined viscosity range or viscosity, a stock solution of ink (viscosity adjusting agent or defoaming agent) may be added to the ink can n or may injected by the defoaming device. Generally speaking, in a case of increasing the viscosity of the ink such that the viscosity of the ink falls within the predetermined viscosity range or viscosity, a stock solution as a high-viscosity agent (viscosity adjusting agent) may be added to the ink, or in a case of lowering the viscosity of the ink, water as a low-viscosity agent (viscosity adjusting agent) may be added to the ink.

Further, the addition of the viscosity adjusting agent by the adjustment control is not limited to being performed every time the viscosity of the ink is measured, and may be performed every two or three times of viscosity measurement. In this case, in the determination control, the average value of a plurality of measured viscosities is compared with the predetermined viscosity range or viscosity.

Further, in a case where the approach of the ball is not detected within a predetermined time after the start of the measurement control, error control of stopping the ink viscosity measurement and then supplying the ink may be performed.

In addition, the adjustment mechanism for adding a viscosity adjusting agent may be provided separately from the defoaming device.

In a case of using oil-based ink instead of the water-based ink, an oil-based viscosity adjusting agent is used. Further, the viscosity adjusting agent may be a fixed shape or a solid in addition to a liquid.

—Modification Example regarding Ink Supply Path—

In the supply path, in addition to or instead of the valve interposed in the upstream side of the viscosity measurement device, a valve may be interposed in the downstream side of the viscosity measurement device. If the valve on the downstream side is closed when measuring the viscosity of the ink, the flow of the ink whose viscosity is measured can be suppressed, which contributes to improvement in the accuracy of the ink viscosity measurement.

Conversely, the valve may be omitted from the supply path. In this case, a pump of a type that cuts off the flow of ink at the time of stop may be used, and the pump may have a valve function.

The viscosity measurement device is not limited to the configuration in which it is disposed in series with the pump, and may be disposed in parallel with the pump. In this case, a valve for branching or merging the ink which is supplied to cause the ink to flow to the viscosity measurement device is required, and thus although the configuration is complicated as compared with the ink supply device III described above, the ink supply and the ink viscosity measurement can be performed in parallel, which contributes to the availability of the printing machine.

—Other—

In the present case, the viscosity measurement device which is used in the ink supply device is the minimum configuration, and the printing machine, the ink circulation device, or the like is not essential configuration, and the present case can be applied to various machines or devices.

REFERENCE SIGNS LIST

I: printing machine
II: ink circulation device (printing liquid circulation device)
III: ink supply device (printing liquid supply device)
IV ink returning device (printing liquid returning device)
1: printing section
3: viscosity measurement device
4: defoaming device
5: control device
6: chamber (ink reservoir)
9: washing mechanism
10: anilox roll
30: passage part
31: upper passage portion (first passage portion)
32: intermediate passage portion (second passage portion)
33: lower passage portion (third passage portion)
34: enlarged diameter passage portion
35: reduced diameter passage portion
36, 37: stopper
41: nozzle
42: filter
69: watering part
$A_1$: first area
$A_2$: second area
$A_3$: third area
B: ball (measurement tool)
C: ink can
$L_R$: return path
$L_S$: supply path
P: pump
R: predetermined vertical area
$S_P$: proximity sensor
$S_{PU}$: upper sensor
$S_{PL}$: lower sensor
$V_C$, $V_S$: valve

The invention claimed is:
1. A printing liquid supply device comprising:
a pump that is interposed in a supply path of a printing liquid and pumps the printing liquid; and
a viscosity measurement device interposed in the supply path to measure viscosity of the printing liquid,
wherein the viscosity measurement device includes
a passage part having a first passage portion in which a flow path cross-sectional area for the printing liquid is set to a first area, and a second passage portion which is disposed upstream of the first passage portion in a supply direction of the printing liquid and in which the flow path cross-sectional area for the printing liquid is set to a second area smaller than the first area, the passage part being interposed in the supply path and disposed on an upper side toward a downstream side in the supply direction of the printing liquid, a measurement tool which is pushed up by the printing liquid when supply of the printing liquid is performed, and falls in the printing liquid when the supply of the printing liquid is stopped, and a measurement part which is mounted to the second passage portion and measures the viscosity of the printing liquid, based on a time for which the measurement tool falls in a predetermined vertical area in the second passage portion, and wherein the first passage portion is provided with an enlarged diameter passage portion whose flow path cross-sectional area continuously increases from the second passage portion toward the downstream side in the supply direction of the printing liquid.

2. The printing liquid supply device according to claim 1, wherein the viscosity measurement device is disposed in series with the pump in the supply path.

3. The printing liquid supply device according to claim 1, wherein the viscosity measurement device is disposed downstream of the pump in the supply direction of the printing liquid.

4. The printing liquid supply device according to claim 1, further comprising:

a valve interposed in the supply path to cut off a flow of the printing liquid when the viscosity of the printing liquid is measured by the viscosity measurement device.

5. The printing liquid supply device according to claim 4, wherein the valve is disposed upstream of the passage part in the supply direction of the printing liquid.

6. The printing liquid supply device according to claim 1, further comprising:

a washing mechanism for causing a washing liquid to flow in a direction opposite to the supply direction of the printing liquid, wherein the viscosity measurement device further includes a third passage portion in which the flow path cross-sectional area for the printing liquid is set to a third area larger than the second area, and which is disposed upstream of the second passage portion in the supply direction of the printing liquid.

7. The printing liquid supply device according to claim 6, wherein the third passage portion is provided with a reduced diameter passage portion whose flow path cross-sectional area continuously decreases toward the second passage portion.

8. The printing liquid supply device according to claim 1, further comprising:

a defoaming device that eliminates bubbles of the printing liquid.

9. A printing liquid circulation device comprising:

the printing liquid supply device according to claim 8; and a printing liquid returning device that returns the printing liquid supplied by the printing liquid supply device to the printing liquid supply device again.

10. The printing liquid circulation device according to claim 9, wherein the defoaming device is interposed in the printing liquid returning device.

11. A printing machine comprising:

the printing liquid circulation device according to claim 9; and a printing section that performs printing by using the printing liquid that is circulated by the printing liquid circulation device.

12. The printing liquid supply device according to claim 8, wherein the defoaming device includes a nozzle that injects a defoaming agent for eliminating bubbles to the printing liquid.

13. The printing liquid supply device according to claim 12, further comprising:

an adjustment mechanism for adding a viscosity adjusting agent for adjusting the viscosity of the printing liquid to the printing liquid; and a control device having a determination unit that determines whether or not the viscosity of the printing liquid measured by the viscosity measurement device is within a predetermined viscosity range, and an adjustment unit that performs adjustment control of operating the adjustment mechanism according to a determination result by the determination unit.

14. The printing liquid supply device according to claim 13, wherein the adjustment mechanism uses the defoaming agent as the viscosity adjusting agent.

15. The printing liquid supply device according to claim 13, wherein the control device includes a frequency setting unit that measures the viscosity of the printing liquid again after a predetermined first period has elapsed, in a case where in the determination unit, determines that the viscosity of the printing liquid is within the predetermined viscosity range, and measures the viscosity of the printing liquid again after a predetermined second period shorter than the predetermined first period has elapsed, in a case where in the determination unit, determines that the viscosity of the printing liquid is outside the predetermined viscosity range.

* * * * *